United States Patent

[11] 3,632,248

[72] Inventor Nyles V. Reinfeld
 610 Treeside Ave., Akron, Ohio 44313
[21] Appl. No. 791,381
[22] Filed Jan. 15, 1969
[45] Patented Jan. 4, 1972

[54] INJECTION PRESS APPARATUS
 5 Claims, 2 Drawing Figs.
[52] U.S. Cl. .................................................. 425/157, 425/247
[51] Int. Cl. ...................................................... B29f 1/03
[50] Field of Search ........................................... 18/30 CK, 30 CR, 30 FQ, 30 I, 30 NR, 30 NV, 30 NM, 30 NP, 30 NN, 30 CM, 30 LV, 30 LM, DIG. 2

[56] References Cited
UNITED STATES PATENTS

| | | | |
|---|---|---|---|
| 2,187,212 | 1/1940 | McMillin ...................... | 18/30 CK |
| 2,588,662 | 3/1952 | Sayre ........................... | 18/16 C |
| 3,226,769 | 1/1966 | Williamson et al. ........... | 18/30 CK |
| 3,509,600 | 5/1970 | Noble ........................... | 18/30 CK |

FOREIGN PATENTS

| | | | |
|---|---|---|---|
| 1,015,106 | 12/1965 | Great Britain ................ | 425/190 |

Primary Examiner—J. Spencer Overholser
Assistant Examiner—Michael O. Sutton
Attorney—Oldham & Oldham ABSTRACT: This new apparatus includes or relates to an injection molding press wherein injection means including a cylinder and power-actuated piston is provided for forcing a plastic material into a mold cavity and wherein a slidably positioned injection nozzle connects the injection cylinder to a charge sprue provided in the mold. Special means position the injection nozzle for limited sliding movement in sealed relationship with the injection nozzle whereby the injection nozzle can be operated and will function satisfactorily under varied injection molding pressures and conditions. The invention further relates to an automatic power timer and cycle control means connecting to the injection means and to mold positioning means whereby the pressure exerted on the mold for mold closing action can be momentarily relieved to permit entrapped air to escape during an injection molding cycle.

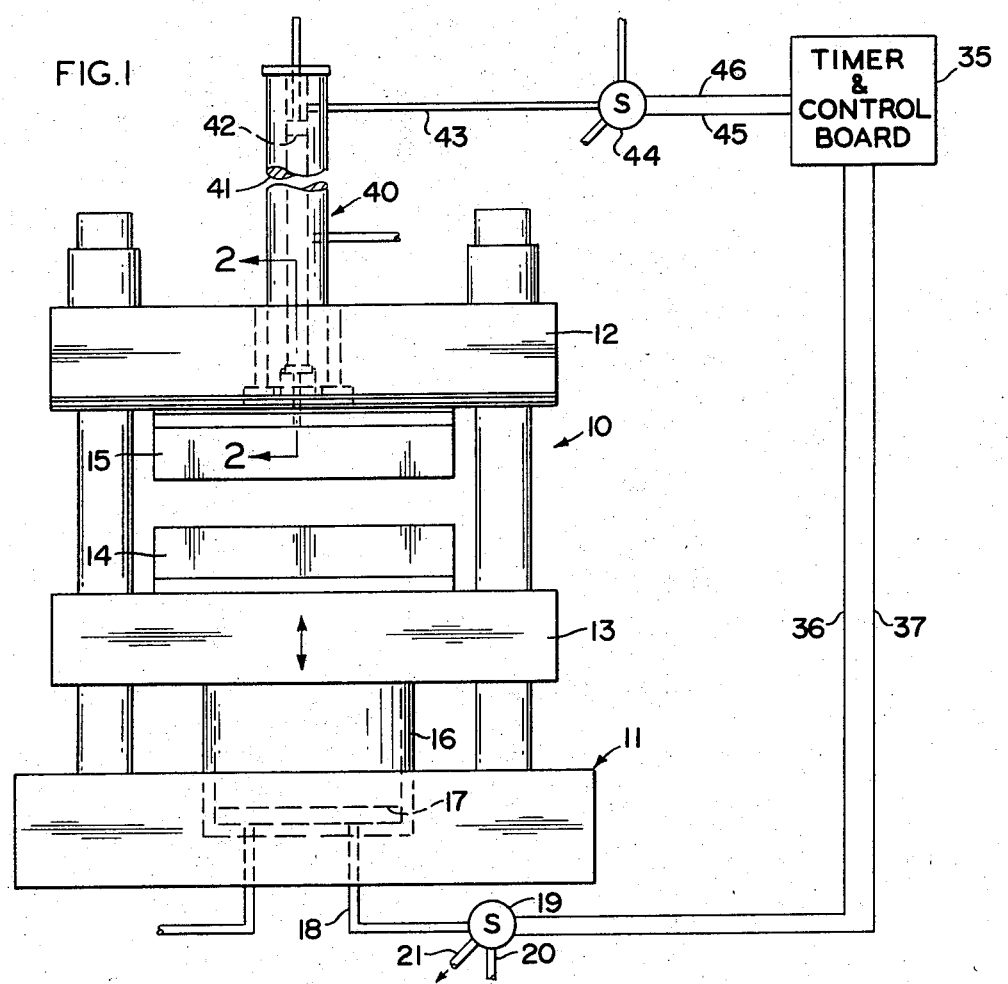
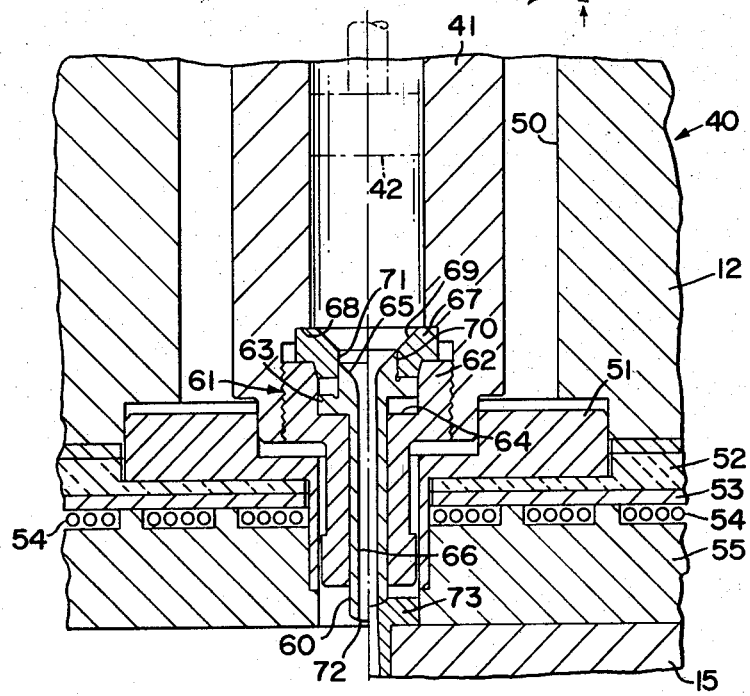

INJECTION PRESS APPARATUS

The present invention relates to injection molding presses and to improved injection nozzle means for the press and wherein the press injection nozzle can have slight movement in its positioning means and maintain sealed relationship between the injection cylinder and an associated mold to compensate for different operating pressures in a mold during a mold filling cycle.

Heretofore there have been various efforts made to provide for the "bumping" of molds during injection molding processes. This bumping of the molds, insofar as I am aware, has primarily been provided after the cavity has been filled with injected material. In all events, there always is a problem in any injection molding operation of removing any air entrapped in the mold cavity and tending to be expelled therefrom when material is forced into the mold.

The general object of the present invention is to provide an improved injection molding apparatus including a slidably positioned nozzle wherein improved mold filling action can be obtained.

Another object of the invention is to provide a special injection nozzle in an injection press and novel control means whereby entrapped air within a mold can be permitted to escape therefrom during a mold injection cycle.

A further object of the invention is to combine a special injection nozzle in an injection press with novel control means for the press whereby the mold sections can be cracked apart momentarily during an injection cycle without loss of injection material or any serious interference with the mold injection cycle.

A specific object of the invention is to provide an injection nozzle at least a portion of which has limited axial movement in the press wherein the nozzle remains in sealed engagement with the injection cylinder during such sliding movement and wherein the sliding movement can be provided to absorb some pressure differentials in the injection material during the injection cycle.

Another specific object of the invention is to provide an improved control and timer means in an injection molding press whereby the injection cycle can include a momentary release of the mold closing pressure to permit an instantaneous mold release or cracking and closing action to permit entrapped air to escape.

The foregoing and other objects and advantages of the invention will be made more apparent as the specification proceeds.

Reference is made to the accompanying drawings wherein:

FIG. 1 is an elevational view of a typical injection press with control means of the invention shown in diagrammatic form associated therewith; and FIG. 2 is an enlarged fragmentary vertical section taken on line 2—2 of FIG. 1.

When referring to corresponding members shown in the drawings and referred to in the specification, corresponding numerals are used to facilitate comparison therebetween.

In general, the present invention can be said to relate to the combination of a special injection means in a plastic injection molding press wherein the discharge nozzle has a limited sliding movement in an axial direction with relation to the remainder of the injection means and which nozzle will remain in sealed engagement with the remainder of the injection means during such sliding movement whereby the position of the nozzle can change with varied pressure conditions applied thereto, and wherein the injection molding press is provided with hydraulically actuated piston and cylinder means for controlling the position of a movable mold in the press and a control valve or equivalent means can be cracked open for an instant during a mold injection cycle to permit entrapped air to escape from the mold press followed by an immediate reapplication of hydraulic pressure to return the molds to fully operative closed conditions.

In the accompanying drawings, a plastic injection molding press is indicated as a whole by the numeral 10. This press is particularly designed for molding natural and synthetic rubbers by an injection molding action, but other elastomer materials can be similarly processed in the press, if desired. The press 10 includes a frame 11 having a top bolster or platen 12 fixedly secured thereto, and a movable platen 13 is suitably slidably positioned on a portion of the frame of the press so that a mold section 14 operatively carried on the movable platen can be brought into engagement with a mold section 15 operatively carried by the top platen 12. The mold sections 14 and 15 are suitably positioned on the associated platens 12 and 13 in any desired manner whereby the mold sections will be abutted together under injection molding conditions to fill a mold cavity defined therebetween with plastic injection material.

The movable platen 13 is controlled in this position on the frame 11 by any conventional means, and usually a double hydraulic cylinder and piston combination is provided in the press, or equivalent means car be used, whereby the movable platen 13 and the mold section secured thereto can be forced to abut against the mold section 15 under predetermined operating conditions. While only one cylinder 16 is shown with a piston 17 being indicated therein, in many instances, it is conventional to use two pistons for controlling the movable platen 13, in the manner shown in expired U.S. Pat. No. 2,191,882 to Mr. Ernst. The drawing shows a hydraulic pressure fluid supply line 18 that connects to a bottom portion of the cylinder 16 and pressure flow of hydraulic fluid to the cylinder 16 is regulated by means of a conventional control means, such as a three- or four-way solenoid controlled valve 19 that connects by a line 20 to a suitable source of hydraulic pressure (not shown). The valve 19 also connects to an exhaust line or conduit 21 whereby when the valve 19 is actuated so as to be positioned in its so-called open position, or exhaust position, fluid will drain from the cylinder 16 through valve 19 to the exhaust line 21.

FIG. 1 of the drawings also clearly shows that a substantially conventional timer and control board indicated by the numeral 35 is also provided for the press 10. Such timer and control board has any suitable power supply provided therefor and it connects by a pair of leads 36 and 37 to the valve 19 whereby when the timer or control functions as established by the control board 35 are so established, control impulses or voltages can be transmitted by the leads 36, 37, to control the positioning or setting of the solenoid valve 19. Thus, upon one predetermined set of operating conditions, the valve 19 is actuated to cause pressure fluid from the line or conduit 20 to flow through the line 18 and provide platen closing movement for the movable platen 13 and any mold section associated therewith However, upon another impulse or control signal to the solenoid valve 19, the valve will be set to connect the line 18 to the exhaust line 21 whereby pressure set up within the cylinder 16 will be almost instantaneously dissipated or greatly reduced whereby a mold opening action will start to occur almost immediately upon change of the valve setting.

The timer and control board 35 also connects to an injection means 40 suitably fixedly secured to the top platen 12. Such injection means includes at least a cylinder 41 that has a power actuated piston 42 slidably carried therein whereby when pressure is provided to the cylinder 41 through a supply tube or line 43, the piston 42 will be forced axially downwardly to discharge material from the injection cylinder 41 as hereinafter described. The pressure supply line 43 normally provides hydraulic operative pressure from a conventional source thereof (not shown) and wherein a solenoid valve 44 or equivalent means is provided in the pressure line 43 to control actuation of the piston 42 at desired times. Leads 45 and 46 connect the solenoid valve 46 or equivalent member to the control and timer board 35 so that control or operative impulses can be sent to the solenoid valve 44 and effect actuation thereof when mold filling cycle conditions are set up and it is desired to produce a mold injection action to form the article in the mold.

FIG. 2 of the drawings shows that the injection means 40, and particularly the cylinder 41 thereof normally extends down through a suitable hole or opening 50 provided in the top platen or bolster 12. Any suitable type of support plate 51 is suitably secured to the lower surface of the top bolster 12 and this injection means 40 is secured to the support plate 51 and top platen or bolster 12 in any desired manner (not shown). Preferably layer of insulation 52 is positioned below the support plate 51 and coverplate 53 is suitably secured in position below the layer of insulation 52. Normally, a plurality of suitable heater units or means 54 are provided in recesses provided in a spacer or mold backup plate 55 that is secured to the top bolster 12 intermediate it and the fixed mold section 15 attached to the lower surface of such backup plate. The provision of the heater means in association with the injection means 40 is conventional and any suitable insulation and heater means may be provided in association with any desired portions of the injection cylinder 41.

As an important feature of the present invention, at the lower end of the injection cylinder 41, an injection nozzle 60 is provided and it is secured to the injection cylinder as by a suitable sleeve, tubular member, or positioning nut 61. The nut 61 has an enlarged axially inner end 62 which is in threaded engagement with the discharge end of the injection cylinder 41. The nut 61 is relatively long in an axial direction and this elongate nut slidably receives the injection nozzle 60 therein with the axially outer end of the injection nozzle, in relation to the injection means 40, protruding from and beyond the lower or axially outer end of the nut 61. The nozzle 60 has a flange 63 formed thereon adjacent its axially inner end and such flange 63 normally will seat on a shoulder 64 facing axially inwardly of the nut 61 and provided in the enlarged upper end thereof. The axially inner end of the injection nozzle 60 has a conically shaped opening 65 that can converges inwardly of the nozzle and connects to a bore 66 extending the length of such nozzle.

In order to position the nozzle 60 properly in the apparatus, and to aid in feeding material thereinto, a lock member or collar 67 is provided. This collar 67 abuts against a shoulder 68 formed at the discharge end of the cylinder 41 adjacent the discharge opening therein, and such collar 67 is forced against the shoulder 68 by the axially inner end of the nut 61 as it is brought into pressure contact therewith by the threaded engagement of the nut with the injection cylinder. An axially outwardly converging bore 69 is formed in the collar 67.

FIG. 2 of the drawings clearly shows that the nut 61 and collar 67 form a confining chamber to secure the injection nozzle 60 in sealed, but sliding engagement with the cylinder 41. The injection nozzle 60 has an enlarged cylindrically shaped inner end section 70 formed thereon and such section 70 is in effectively sealed, tight, sliding metal-to-metal contact with a tubular section 71 formed at the axially outer end of the collar 67. FIG. 2 on the left side section thereof indicates the position of the injection nozzle 60 when operative pressure is fully applied to such injection nozzle, but when no mold closing pressure has been applied to the mold section 15. On the right-hand side or section of FIG. 2, the position of the injection nozzle 60 is shown when full closing pressures have been applied to the mold sections and the nozzle 60 has been forced axially backwardly up toward the injection means 40. Hence, whenever pressure on the axially outer end of the injection nozzle 60 is released or changed, such nozzle can adjust its axial position in the injection means and retain sealed engagement therewith. For example, when the mold sections 14 and 15 are cracked open, there is a tendency for the injection nozzle 60 to move axially inwardly of the press, and it can move toward the position shown on the left side of FIG. 2 and still maintain substantially continuous injection molding action during a mold separation interval in an injection molding cycle.

It will be seen that the axially outer end of the injection nozzle 60 protrudes beyond the nut 61 and that such nozzle has a contoured surface 72 that is adapted to seat on a sprue 73 formed complementary in shape to the end of the nozzle. Thus, a tight, but effective pressure retaining seat is obtained to lead the injected material into the distributing sprues formed in the mold sections being processed.

The "bumping" action of the mold sections 14 and 15 on the inject cycle preferably occurs near the end thereof. The timer and control means 35 are programmed so that they actuate the solenoid valve 44 or other similar means to shut off injection action temporarily while the molds are cracked apart and brought back together under full pressure mold closing conditions.

Suitable means and controls (not shown) are provided to return the piston 42 to retracted position and to supply injection material to the injection means 40.

By a combination of the novel injection means and slidable injection nozzle in the press of the invention, together with the novel control means provided, an improved injection molding action can be obtained with a minumum of spoilage of the formed part by air entrapped in the mold cavity. Hence, it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. In an elastomer injection molding press including a frame having a fixed platen therein adapted to have a mold section operatively secured thereto, injection means including a cylinder having a discharge end operatively secured to said fixed platen, the improvement comprising a tubular means secured to said cylinder at its discharge end, an injection nozzle slidably positioned within said tubular means and extending to and through said platen to any mold section secured thereto, said nozzle having limited axial movement in said tubular means and being in sealed engagement therewith, said tubular means comprising an elongate nut secured to said cylinder at its discharge end, a nut collar operatively positioned in said cylinder to extend across the bore thereof by said nut, said nut collar having a cylindrical section in its axially outer end and an axially inwardly tapering section at its axially inner end connecting to said cylindrical section, and said injection nozzle has a flange on its axially inner end slidably confined between said nut collar and a part of said nut for limited axial movement of said nozzle.

2. In an injection press including a frame having a fixed platen therein, a movable platen slidably carried by said frame parallel to said fixed platen, hydraulic piston and cylinder means engaging said movable platen to move it towards and away from said fixed platen, a mold member operatively engaging said fixed platen and a mold section operatively carried by said platen and being movable into engagement for molding action in a molding cavity formed thereby, an injection means including an outlet member having a nozzle member operatively connecting to said fixed platen and said mold member thereon for forcing material into the mold cavity, and power means for actuating said injection means, the improvement comprising automatic power timer and cycle control means connecting to said power means to control material injection, hydraulic pressure supply means connecting to said cylinder to control mold closing movement of said movable platen, a control valve connected in said hydraulic supply means to control hydraulic pressure flow to and exhaust from said cylinder, circuit means connecting said control valve to said power and control means to actuate said control valve for pressure release action and to return pressure application rapidly at least once for each operating cycle of the press before completion of such cycle, and means positioning said nozzle member, injection means member, and mold member on said fixed platen in sealed relationship but providing for some movement between two of said members without breaking the seal therebetween.

3. In a molding press as in claim 1, the provision of a movable mold platen, a hydraulic actuated means to control the position of said movable mold platen, a control means for said hydraulic actuated means to withdraw pressure therefrom for a predetermined instant during a mold filling cycle and then to reapply said pressure thereto.

4. In an injection press including a frame having a fixed platen therein, a platen slidably carried by said frame parallel to said fixed platen, hydraulic piston and cylinder means engaging said platen to move it towards and away from said fixed platen, a mold section operatively carried by each of said platens and being movable into engagement for molding action in a molding cavity formed thereby, an injection means including a piston secured to said frame and having a nozzle means operatively connecting to said fixed platen and the mold section thereon for forcing material into the mold cavity, power means for actuating said injection means, the improvement comprising automatic power timer and cycle control means connecting to said power means to control material injection, hydraulic pressure supply means connecting to said cylinder to control mold closing movement of said movable platen, a control valve connected in said hydraulic supply means to control hydraulic pressure flow to and exhaust from said cylinder, circuit means connecting said control valve to said power and control means to open said control valve for pressure release and to close it rapidly for pressure application at least once for each operating cycle of the press before completion of such cycle, and means positioning said nozzle for limited sliding movement in said injection means in sealed association therewith.

5. In an injection press as in claim 4 where said automatic power timer and cycle control means includes control members connected to said power means to interrupt actuation of said injection means when said control valve is opened for pressure release and until mold closing action reoccurs.

* * * * *